United States Patent [19]

Erb et al.

[11] Patent Number: 4,655,400

[45] Date of Patent: Apr. 7, 1987

[54] COFFEE GRINDING METHOD

[75] Inventors: William W. Erb, West Trenton; Ernest R. LaSalle, Spring Lake Heights; James P. Mahlmann, Princeton Junction, all of N.J.

[73] Assignee: General Foods Corporation, White Plains, N.Y.

[21] Appl. No.: 728,427

[22] Filed: Apr. 29, 1985

[51] Int. Cl.⁴ .......................... A47J 42/26; B02C 4/08
[52] U.S. Cl. ....................................... 241/29; 241/159; 241/235
[58] Field of Search ............... 241/159, 235, 236, 293, 241/295, 7, 13, 29

[56] References Cited

U.S. PATENT DOCUMENTS

| 2,182,131 | 12/1939 | Maede | 241/159 X |
| 3,167,261 | 1/1965 | Wonneberger | 241/159 |
| 3,190,572 | 6/1965 | Goto | 241/235 |
| 3,491,952 | 1/1970 | Krolopp | 241/159 X |

Primary Examiner—Mark Rosenbaum
Attorney, Agent, or Firm—Thomas A. Marcoux; Michael J. Quillinan; Daniel J. Donovan

[57] ABSTRACT

Roasted coffee is ground by passage through grinding and regrinding steps, each step being characterized by having the rolls thereof in each pair thereof moving linearly at the same speed to produce a granulized coffee, the coffee being ground substantially in a single bean dimension and being thereby discretely cracked.

1 Claim, 3 Drawing Figures

COFFEE GRINDING METHOD

TECHNICAL FIELD

The present invention relates to a roasted coffee size-reduction method and more particularly means for performing said method at a substantially free-flow density decrease and a substantial through-put of coffee.

BACKGROUND ART

Heretofore in commercial production there have been mainly two processes used to grind roasted coffee. The first essentially employs a Gump grinder of the type that has been traditional in the art. The second involves the use of a Nippon Crack-U-Lator of the type set forth in U.S. Pat. No. 3,190,572 issued June 22, 1965 to Gotto for Coffee Granulating Apparatus.

The first of these processes, Gump grinding, involves passing roasted coffee through fixed openings; a shearing/cutting action compresses and subdivides the beans. This generally involves employing three grinding heads, starting with a cracking head with fixed openings feeding into an adjustable grinding head and then onto an adjustable regrinding head. The key to this Gump apparatus has been the employment of cracking, grinding, and regrinding roll-pairs under conditions creating a differential in linear speed.

Nippon milling, on the other hand, typically utilizes four pairs of rolls, each pair operating at an equal rpm and linear speed, i.e., 1:1, as contrasted with the Gump. Thus, in the Nippon rolls, from the initial coarse set of rolls, the coffee is fed through a series of narrower cut rolls, all of which are similarly equipped to operate at equal rpm in each pair thereof.

In general, insofar as presently known, in the case of the Gump grinder, the cracking, grinding and regrinding sections will occur at a differential in roll speed, typically 2:1 and higher. The Nippon mill, on the other hand, wherein each of the roll pairs operate at an equal rpm, produces a cracked and granulated coffee particle having a lighter density than the Gump. The Nippon grind will generally be of a narrower particle size distribution than a Gump and have less coarse and fine particles. However, when size-reducing using the Nippon, a "silver-skin-chaff" is released in large pieces; the chaff thus produced is not broken up and this results in an unsightly product which must be separately reduced in size or removed. Furthermore, there is a reduction in the through-put of a Nippon vis-a-vis a Gump, depending upon the size of the grind; accordingly, the Nippon fine grind has less through-put than the coarser grind.

To explain further, the Nippon mill, rather than crushing or grinding, literally cracks the material into a uniform, narrow range of particle size through a series of vertical corrugated rolls. The roller surface applies a linear stress in the circumferential direction to the coffee particles being fed into it. Each peak on the rollers acts as a fulcrum point to particles bridged across the corrugation of the mating rollers. The Nippon gaps are set for each set of rolls and are locked without any give. This results in the need for a balanced staged reduction of roll pairs. As a result, the throughput is limited to the narrowest gap between the final set of rolls with the steepest pitch having the smallest clearance. The net result is a throughput which is lessened or reduced relative to the size produced. Moreover, the Nippon rolls are designed such that gravity and the angle of nip are used to limit the feed rate. On the other hand, the Gump rolls, operating at a speed differential in each pair, are designed with one of the two having lateral/horizontal cut rolls in a pair thereof to mechanically force the coffee between the rolls thereby allowing for greater throughput.

It is a primary object of this invention to increase the throughput of a grinding operation with a control of density and particle size distribution, and indeed provide an increase in capacity greater than the Nippon and the Gump as well as a significant decrease in density as desired. A second object of the invention is to meet these criteria by modifying existing equipment.

DISCLOSURE OF THE INVENTION

In accordance with the present invention the foregoing objects are met in a manner which in retrospect is simple; but in terms of result is profound. In brief, the grinding and the regrinding rolls are operated at equal rpms in each pair thereof, with the coffee being fed to the cracking rolls preferably by a powered distributing feeder. Roasted coffee may be charged first to the powered distributing feeder whereon it is uniformly distributed and whereby initial size reduction is effected uniformly by the cracking rolls. Thereafter, the coffee is fed to the nips of the grinding and regrinding roll pairs, the rolls in each pair being driven at an equal rpm, though each pair may have different rpm as will be explained. However, other means of feeding the initial cracking-rolls feed may be operative to afford uniform distribution of coffee beans, as will be described hereinafter.

In any event, it also is important that the equally paired rolls in at least one roll pair have a vertical ring cut acting in combination with a lateral horizontal cut roll to provide the countercutting effect and pull for the feed operating at high speed that may be practiced herein. By so combining equal roll rpm in each pair thereof and the roll cuts specified, a steady maximal throughput may be practiced because of minimum cutting time required. The equal rpm provides an impact cracking without compaction. Thus, the present grind distribution is similar to the present Gump particle size distribution and the density is similar to that of the Nippon while the overall rate of grinding that may be practiced is significantly increased over both type of mills.

Traditionally, the Gump feeder was equipped with a star feeder which served to distribute the coffee in a broken flow. For a number of reasons, this star feeder was disposed of and in turn replaced by direct gravity feed onto the rolls. But direct gravity feed via a slide gate which controls the feed onto the cracking rolls also has disadvantages in that the beans are not distributed evenly across the rolls; as a result, increased wear in the center of the rolls occurred, necessitating retooling or reconditioning. Employing a powered distributing feeder above the cracking head so that coffee is uniformly distributed thereacross in a certain of product, a reasonably measured even feed of coffee (at adjustable rates, if need be) may be practiced along the roll length. This feeder thereupon feeds the mill with a curtain of whole coffee and then the coffee is cracked to produce a uniform curtain of cracked beans in the mill. In essence, the powered distributing feeder is mounted atop the cracking head shown in Coffee Processing Technology by Sivetz et al., Vol. II (1979), at page 271.

The thusly cracked beans now enter the grinding and the regrinding roll pairs which are set to operate respectively in a manner that characterizes the present invention; namely, each roll pair operates at a 1:1 relationship, though each pair may be operated at a different speed. Thus, the coffee is fed under gravity to the grinding and regrinding rolls which are similarly caused to operate at a 1:1 relationship, as will be described in detail herein. Although two such roll pairs are shown, the invention is not to be restricted thereby since grinders and regrinders of ground coffee substrates having 3 or more pairs of rolls may be similarly employed.

BEST MODES FOR CARRYING OUT THE INVENTION

Figure 1:
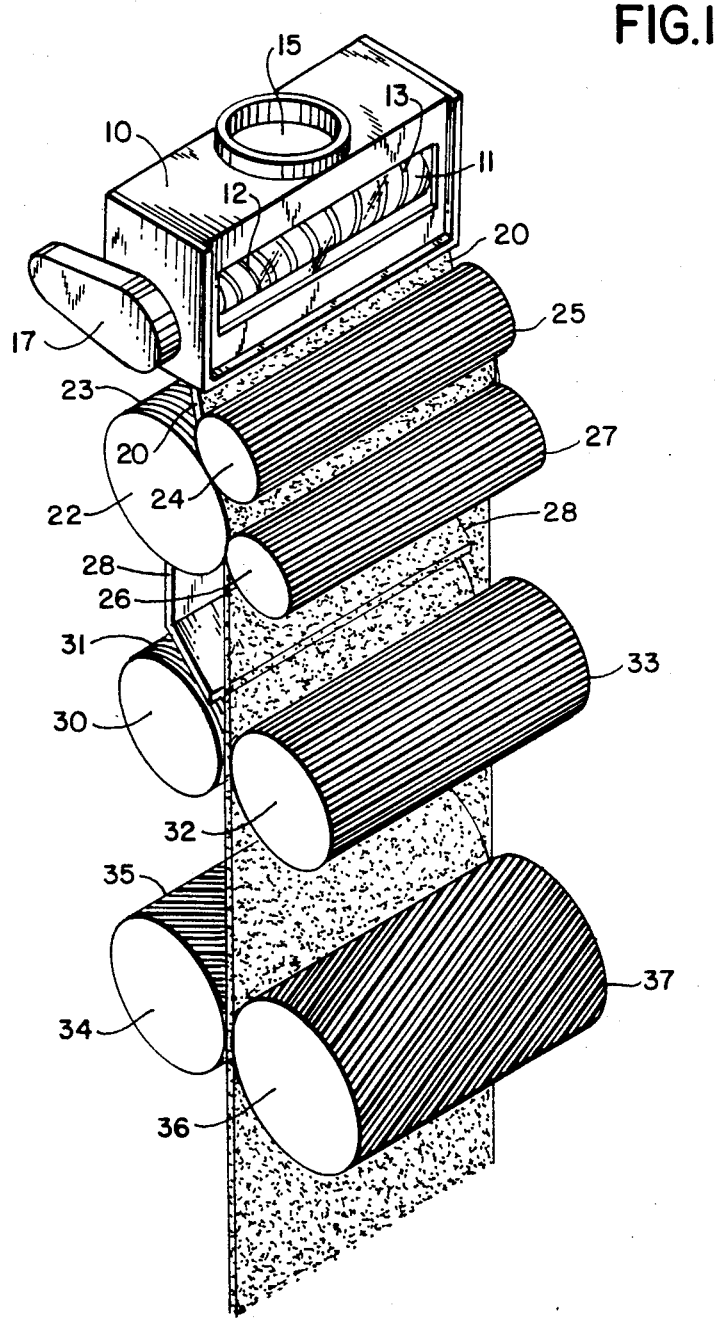
FIG. 1 is a schematic side-perspective view of apparatus for carrying out the invention.

In the drawings, coffee such as a Thermalo-roasted blend, although other types of coffee roasts may be employed such as a Probat-roasted blend, is charged to the powered distributor 10 and the appertenance thereto as follows:

A roller 11 having halves grooved to distribute the feed evenly along the roller as at 12,13 is mounted within a housing 14. Coffee is charged through a port 15, falls onto roll 11, and is transmitted longitudinally along the smooth roller 11 by grooves 12 and 13 under the control of drive 17 as set forth in the 1984 edition for a Power Feeder Instruction Manual of Modern Process Equipment Incorporated, Chicago, Ill.

From the powered distributor feeder 10, a uniform curtain of product passes onto adjustable plate 20 superposed over the larger roll of a double reduction granulizing breaker roll composite, the large roll being designated 22 and the two granulizting breaker rolls being 24 and 26. From the granulizing breaker rolls 24–26 the coffee passes to an adjustable baffle 28 and is then caused to pass between the nips of respective granulizing rolls 30, 32 and regranulating rolls 34, 36. These roll pairs 30, 32 and 34, 36 are springloaded on one side for each pair so that a monolayer of subdivided coffee particles feeds the nips of succeeding granulating and regranulating roll pairs. Springloading allows abnormally hard materials such as stones and pieces of metal to pass through the rolls in each pair thereof without impairing the roll surface and also prevents mill overload due to excessive or unusual physical properties of the feed material.

It will be noted that roll 22 has its annular cutting edges 23 running perpendicular to horizontal cuts 25 and 27 on the two breaker rolls 24 and 26, which thereby serves to force feed coffee between the rolls. Thereafter, the initially cracked coffee passes the nip between granulizer rolls 30, 32, the roll 30 having vertical cutting portions 31 and the roll 32 having longitudinal cutting portions 33 normal thereto which allow the coffee to be force fed. From the granulizing rolls 30–32, which are caused to operate at substantially equal rpm, the coffee is deposited for a further reduction of grind size by rolls 34–36, the latter rolls having slightly angled longitudinal cuts 35 and 37 as shown, that are also operating at equal rpm.

From the initial breaker rolls 22, 24 and 26, the granulizing rolls 30, 32, and the fine granulizing rolls 34, 36 just described, the feed of finely ground coffee enters a scalping screen by way of a normalizer bypass system not part of the present invention. In essence, the discharge from the fine grind granulizing rolls 34, 36 is such as set forth at page 271 of Sivetz et al., cited above, bypasses the normalizer thereof and is discharged directly onto the scalping screen.

The grinding rolls 30, 32 have countercutting LePage cuts at 31, 33 thereon which are known and used in the art and are also shown and described in Sivetz et. al, cited, at page 267. Thus, vertical cuts 31 rotate to meet longitudinal cuts 33. In this operation following the prior art, the coffee beans are normally ground by shear under pressure. But when operating at an equal rpm, in accordance with the present invention, the beans are impacted and cut with minimal and preferably no compression and shearing as contrasted with standard countercutting shear and pressure stemming from conventional Gump grinding rolls operating at a speed differential of say 2:1 or higher. Moreover, the ground beans are fed to the nip where they are impacted and cut as contrasted with prior art where size-reduced beans are fed onto the rolls. From the grinding section the ground coffee next passes to the regrinding zone where there is a further size reduction at the nip between slightly angled longitudinal cuts 35 and 37 which are angled along their length as shown.

The nip feed gap herein has a dimension no greater than a single bean stream passing the point of contact or impact with the cuts of the grinding and the regrinding rolls. This condition is assured by use of a device such as the power distributing feeder 10 which uniformly along the length of the roll sections 12 and 13 thereof feeds a monolayer of coffee to the nip of the cracking rolls that are maintained through the succeeding granulating and regranulating roll pairs 30, 32 and 34, 36.

When feeding in this manner, care is exercised not to force feed and to avoid overloading the nip of any set of rolls to avoid over-compression of the coffee and secondary granulation, wherein coffee particles contact one another prior to passage through the nips of each set of rolls.

EXAMPLE I

To illustrate the advantages of the present invention in this embodiment, coffee was fed at the stated rates (refer to Table 1) in pounds per hour to a conventional Gump grinder and to a Gump grinder modified in accordance with the present invention. Referring to the tabulated data set forth in Table I hereinafter, it will be noted that the data sets forth the gap settings at the cracking, grinding and regrinding sections for roasted coffee which is fed therethrough in a conventional manner at the stated speeds (column one), and then in a manner in accordance with the present invention (column two).

TABLE I

| | Column 1 | Column 2 |
|---|---|---|
| Mill | Conventional Gump Model 888E | Modified Gump Grinder Model 888E |

TABLE I-continued

| | Column 1 | Column 2 |
|---|---|---|
| | | the Present Invention |
| Rate | 3000 pounds per hour | 4000 pounds per hour |
| Feed | Gravity | Power distributing as shown and described |
| Cracking Section | 3 fixed rolls | 3 fixed rolls |
| | 1 @ 7" diameter (80 rpms) 22 | 1 @ 7" diameter (80 rpms) 22 |
| | 1 @ 4" diameter (233 rpms) 24 | 1 @ 4" diameter (233 rpms) 24 |
| | 1 @ 4" diameter (268 rpms) 26 | 1 @ 4" diameter (268 rpms) 26 |
| Gap Setting | 1st break 0.031" | 1st break 0.031" |
| | 2nd break 0.041" | 2nd break 0.041" |
| Cuts Per Inch | large 7"diameter roll - 10 cuts/inch first countercutting roll 24 - 4½ cuts per inch second countercutting roll 26 - 8 cuts per inch | Same as Column 1 |
| Grinding Section | 2 rolls/6" diameter (30, 32) each 18 cuts per inch operating at 1.9/1 (830/438 rpm) | 2 rolls/6" diameter (30, 32) each 18 cuts per inch operating at equal (648) rpm |
| Gap Setting | 0.025" | 0.025" |
| Regrinding Section | 2 rolls/7" diameter (34, 36) each 20 cuts per inch operating at 1.9/1 rpm (830/441 rpm) | 2 rolls/7" diameter (34, 36) each 20 cuts per operating at equal (720) rpm |
| Gap Setting | 0.024" at 25° angle from the horizontal | 0.021" at 25° angle from the horizontal |
| Designed Volume of Ground Coffee Automatic drip grind (average particle size 780 microns) | 2,500–3,600 lbs/hr (Tested Capability) | 3,500–5,000 lbs/hr |

Thus, the cracking sections had the gap settings for the nip between initial roll 22 and roll 24 and the second nip between roll 22 and roll 26 set at 0.031 and 0.041 inches respectively, whereas the grinding section had the rolls 30 and 32 operating at a 0.025 inches gap setting. The regrinding section at the rolls 34 and 36 were spaced at 0.024 inches for a conventional Gump and at 0.021 inches for the modification of the present invention. The feed for the conventionally ground coffee (1) and the feed for the unconventionally ground coffee (2) is set forth. All conditions were comparable. The grinding section as well as the regrinding section for the conventional milling operations were at 1.9:1 (830/438) rpm for 6" diameter rolls in the grinding section and 7" diameter rolls in the regrinding section operating at substantially the same rpms and ratio as for the 6" diameter rolls. The grinding and regrinding sections were operated in accordance with the present invention at a substantially equal rpm, i.e., about 648 rpm for each of the rolls of the grinding section and at about 720 rpm for the rolls of the regrinding section.

It will be noted that the optimal specifications for automatic drip-ground coffee using a conventional Gump was 2500 to 3600 pounds per hour, whereas those for the same grind of the present invention was 3500–5000 pounds per hour, the grind having an average particle size of 780 microns in each case. In essence therefore, a mill equipped to operate the grinding and regrinding section rollers at an equal rpm could be operated at a substantially higher pounds per hour feed rate. This is done simply by changing the roll sprockets for the grinding section and the regrinding to provide equal rpms. Further, the equal rpm practiced on the grinding and regrinding rolls sets produced a 2.3–3.0% lighter density product notwithstanding the corresponding ability to maintain a substantially higher rate production at 3000–4000 pounds per hour. On the other hand, comparing a modified Gump operating in accord with this invention and the aforementioned Nippon mill, the former has a substantially higher throughput capacity, viz., in the order of 50% greater throughput.

EXAMPLE II

Figure 2:
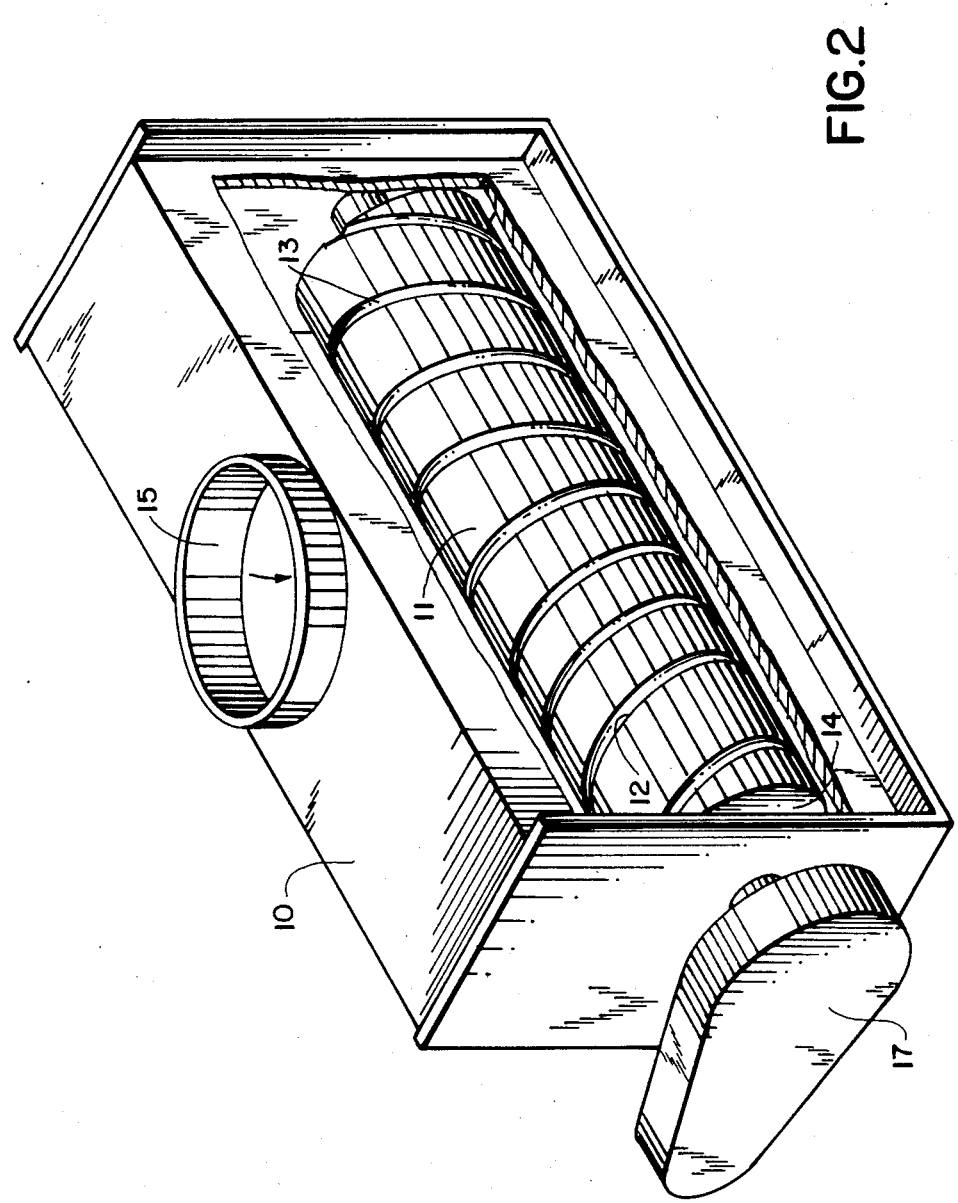
FIG. 2 is an expanded view in perspective of the powered distributing feeder to facilitate understanding.
Figure 3:
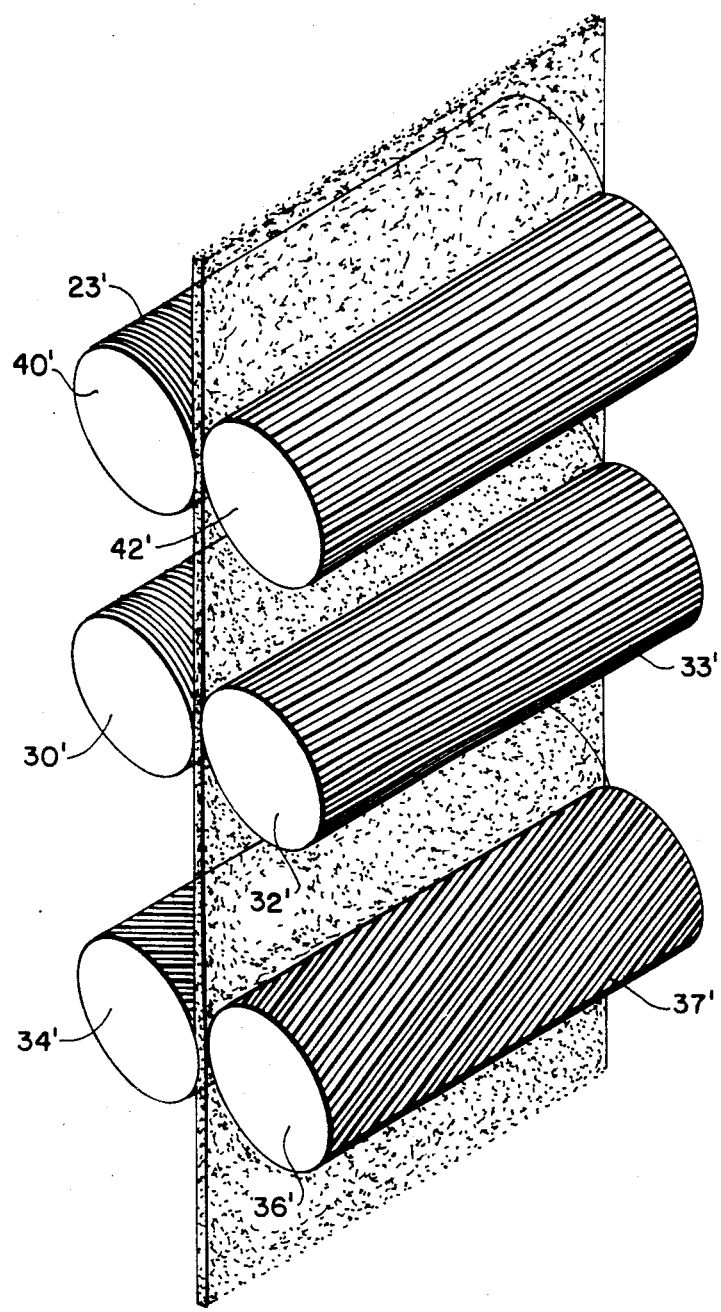
FIG. 3 is a like view of another embodiment of the invention shown in FIG. 1.

A modification of the device shown by Example 1 was employed wherein the cutting rolls 22, 24 and 26 were replaced by a pair of countercutting rolls. This device shown in FIG. 3 is like that of FIGS. 1 and 2, employing equal rpm's for a roll pair; thus, the grinding and regrinding roll pairs being the same, whereas the cracking action of rolls 22, 24 and 26 was replaced by a roll pair 40'–42' having 8 cuts per inch, the roll 40' being horizontally cut and the roll 42' being vertically cut. The diameter of rolls 40'–42' were each 6" as was the roll diameter for granulizing (30'–32') and the regranulizing rolls (34'–36'). The rolls were mounted on an "F" adjustable cracking head. The countercutting rolls 40'–42' were operated at 700 rpm, the grinding rolls 30'–32' at 635 rpm and the regrinding rolls 34'–36' at 740 rpm. The gap settings for the cutting rolls were 0.092", for the grinding rolls 0.018" and for the regrinding rolls 0.016". The grind was produced at 400–500 lbs per hour. Reference characters in FIG. 3 which correspond to those in FIGS. 1 and 2 are similarly denominated with the expression prime (').

The ground coffee had a 5% lighter density than a Gump control which operated at a differential roll speed of 2:1.

While the invention has been described by reference to specific embodiments, the scope hereof is to be interpreted in accordance with the scope of the accompanying claims.

We claim:

1. A process for subdividing roasted coffee beans with a control of density and particle size distribution at increased rates of production, comprising the steps of passing whole roasted coffee through a powered distributing feeder means located above a cracking head to uniformly distribute the coffee thereacross as a thin curtain of product; feeding the thin curtain at a measured, even feed between oppositely rotating cracking rolls whereby initial size reduction is effected to provide a uniform curtain of cracked beans, care being exercised to not force feed the coffee and to avoid overloading the nip between the rolls and thereby avoid secondary granulation; and thence passing the ground coffee through at least two pairs of granulating rolls in a manner which does not force feed any roll pair and avoids overloading the respective nips to thereby avoid secondary granulation of the coffee, one roll of each roll pair being spring-loaded on one side whereby the coffee is introduced and passes grinding and regrinding roll pairs in a steady curtain to provide a balanced continuous feed through respective nips of the roll pairs, the granulating rolls of each respective roll pair moving linearly at the same speed and the coffee passing directly to the nips between respective grinding and regrinding roll pairs where they are impacted with no compression and shear, the paired granulating rolls in at least one roll pair having lateral horizontal cuts in one roll acting in combination with vertical cuts in the other roll to provide a counter-cutting effect, the ground coffee passing each roll pair with an impact without compaction, the coffee being thus ground and then reground substantially in a thickness no greater than that of a single bean.

* * * * *